US009538235B2

(12) United States Patent
Lin et al.

(10) Patent No.: US 9,538,235 B2
(45) Date of Patent: Jan. 3, 2017

(54) STREAMING AN INTERACTIVE PROGRAM GUIDE USED FOR MEDIA CONTENT AND HOME AUTOMATION

(71) Applicants: Cellco Partnership, Basking Ridge, NJ (US); Verizon Patent and Licensing Inc., Basking Ridge, NJ (US)

(72) Inventors: Te-Sheng Lin, Cresskill, NJ (US); Lily F. Chen, Fort Lee, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 23 days.

(21) Appl. No.: 14/219,229

(22) Filed: Mar. 19, 2014

(65) Prior Publication Data

US 2015/0271547 A1    Sep. 24, 2015

(51) Int. Cl.
| | |
|---|---|
| H04N 21/436 | (2011.01) |
| H04N 21/41 | (2011.01) |
| H04N 7/10 | (2006.01) |
| H04N 21/214 | (2011.01) |
| H04N 21/478 | (2011.01) |
| H04N 21/431 | (2011.01) |
| H04L 12/64 | (2006.01) |

(52) U.S. Cl.
CPC .... *H04N 21/43615* (2013.01); *H04L 12/6418* (2013.01); *H04N 7/106* (2013.01); *H04N 21/214* (2013.01); *H04N 21/4131* (2013.01); *H04N 21/431* (2013.01); *H04N 21/478* (2013.01)

(58) Field of Classification Search
CPC ............... H04N 21/4131; H04N 21/43615; H04L 12/2807; H04L 2012/2849
See application file for complete search history.

(56) References Cited

U.S. PATENT DOCUMENTS

| | | | |
|---|---|---|---|
| 7,404,200 B1 * | 7/2008 | Hailey | G06F 3/04817 348/E5.005 |
| 7,496,946 B1 * | 2/2009 | Wehmeyer | G06F 3/04817 725/48 |
| 2008/0263594 A1 * | 10/2008 | Rutherford | H04N 7/165 725/39 |
| 2009/0100176 A1 * | 4/2009 | Hicks, III | G06F 15/16 709/224 |
| 2009/0249428 A1 * | 10/2009 | White et al. | 725/133 |
| 2012/0291068 A1 * | 11/2012 | Khushoo | H04N 7/186 725/38 |
| 2014/0020033 A1 * | 1/2014 | Wilson et al. | 725/80 |

(Continued)

*Primary Examiner* — Brian T Pendleton
*Assistant Examiner* — Frank Johnson-Calderon

(57) ABSTRACT

A device may be configured to store interactive program guide (IPG) data for generating an IPG. The IPG data may include information related to a media content service for providing media content and including information related to a home automation service for managing a home device. The device may receive input information from a media client device that causes display of the IPG. The input information may indicate an input related to the home device. The device may generate a part of the IPG related to the home automation service based on the input information and a part of the IPG data. The device may obtain home device information from a management server based on the input information. The device may provide the home device information and the part of the IPG to the media client device for display.

20 Claims, 13 Drawing Sheets

(56) References Cited

U.S. PATENT DOCUMENTS

| | | | |
|---|---|---|---|
| 2014/0082672 A1* | 3/2014 | Casey et al. ................... | 725/50 |
| 2014/0195675 A1* | 7/2014 | Silver .......................... | 709/224 |
| 2015/0143408 A1* | 5/2015 | Salas ............................. | 725/33 |
| 2015/0163535 A1* | 6/2015 | McCarthy, III ........ | G05B 11/01 |
| | | | 725/49 |
| 2015/0180678 A1* | 6/2015 | Nadeau ................ | H04L 12/283 |
| | | | 725/39 |
| 2015/0193127 A1* | 7/2015 | Chai .................. | G06F 3/04842 |
| | | | 715/719 |

* cited by examiner

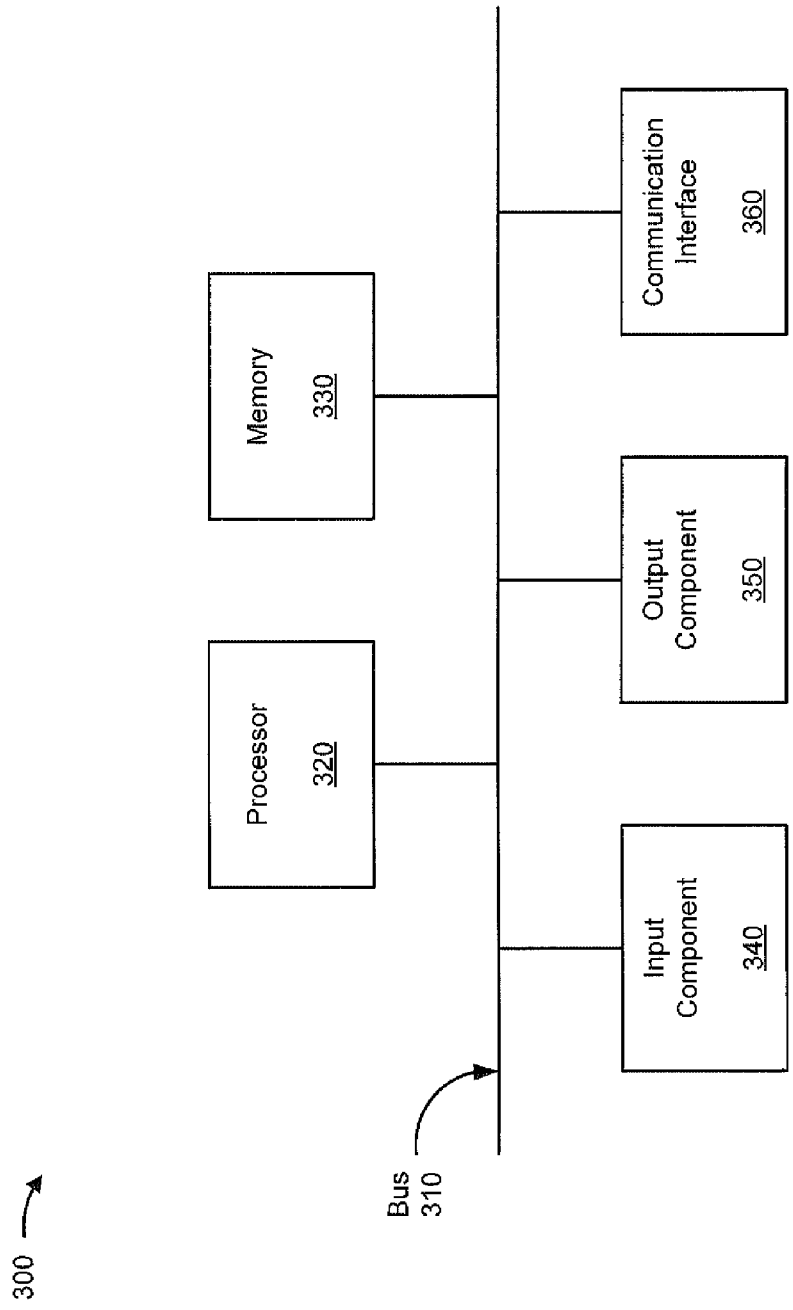

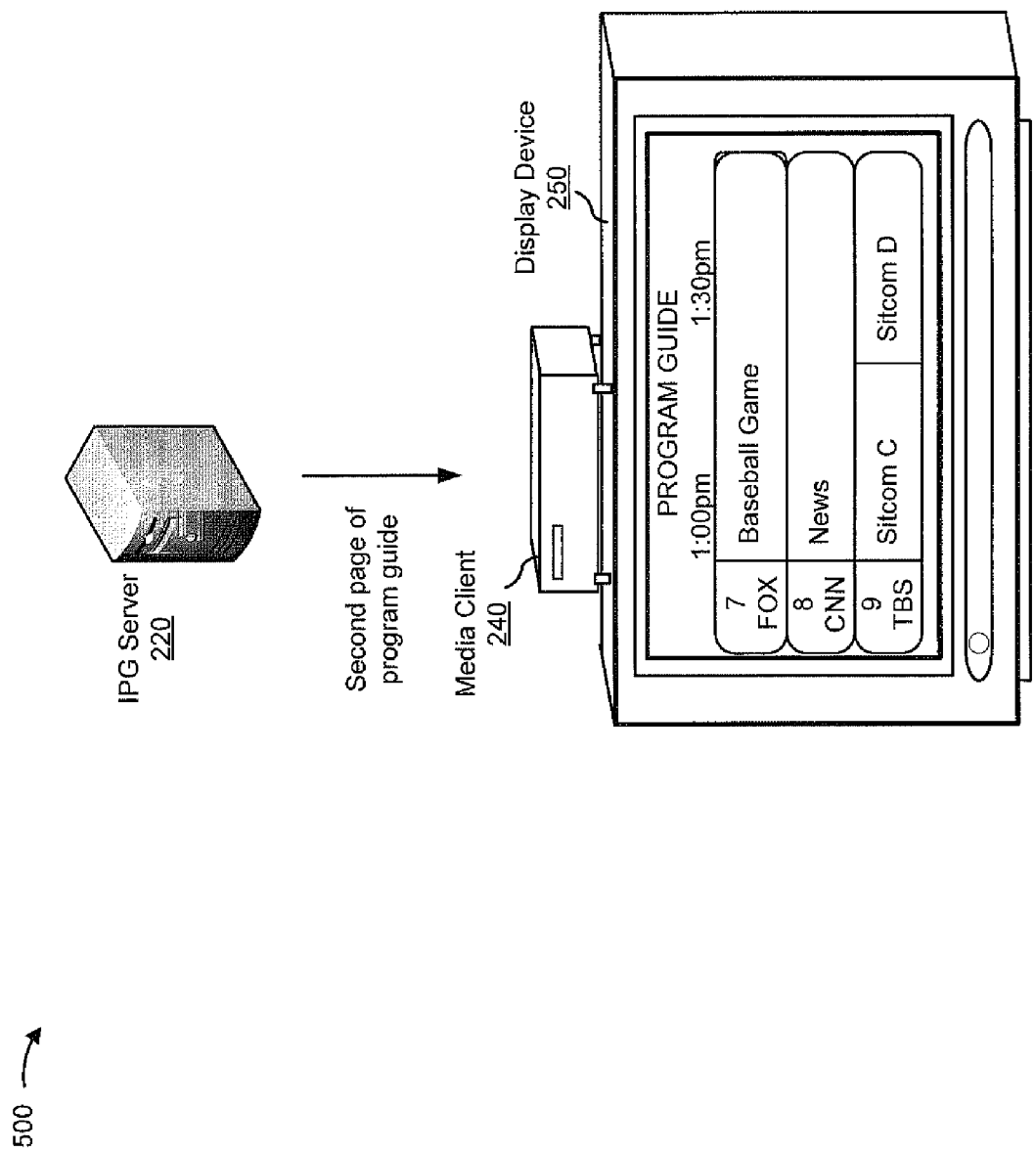

US 9,538,235 B2

STREAMING AN INTERACTIVE PROGRAM GUIDE USED FOR MEDIA CONTENT AND HOME AUTOMATION

BACKGROUND

A set-top box may provide an interactive program guide (IPG) (e.g., an interactive electronic program guide (EPG)) that allows a user to navigate through guide data related to media content provided by a service provider. The service provider may also provide home automation services for managing smart devices in a user's home.

BRIEF DESCRIPTION OF THE DRAWINGS

FIG. 3 is a diagram of example components of a device that corresponds to one or more devices of FIG. 2;

FIGS. 5A-5C are diagrams of an example implementation relating to the process shown in FIGS. 4A and 4B.

DETAILED DESCRIPTION OF PREFERRED EMBODIMENTS

The following detailed description of example implementations refers to the accompanying drawings. The same reference numbers in different drawings may identify the same or similar elements.

Presently, a set-top box may receive guide data for media content on a daily basis from a service provider. In other words, a set-top box may receive an entire day's worth or week's worth of guide data all at once and use the guide data to locally generate an IPG on the set-top box. Supplying this much guide data to set-top boxes may burden a service provider's network. Moreover, supplying guide data this far in advance may result in the guide data becoming outdated if the scheduled programming changes after the guide data is supplied.

Implementations described herein may store IPG data (e.g., guide data) on an IPG server rather than providing all the IPG data to a media client (e.g., a set-top box). The IPG server may generate and stream the IPG to the media client in real time based on a user's interaction with the IPG presented by the media client. Accordingly, the burden on a service provider's network caused by providing a day's worth or week's worth of guide data to a media client may be reduced, and more up-to-date guide data may be used to generate the IPG.

Furthermore, a service provider that provides a media content service may also provide a home automation service for a user's home. For example, the service provider may allow the user to remotely control home devices (e.g., appliances, lights, locks, security systems, thermostats, etc.) using the service provider's network. Presently, the user may be required to use different devices to control the media content provided by the service provider and the home automation services provided by the service provider. For example, the user may be required to use a set-top box to control the media content and be required to use a computer (e.g., a smart phone, a tablet computer, a desktop computer, etc.) to control the home automation services.

Implementations described herein may provide an IPG for a media client that integrates control over both the media content service and the home automation service provided by a service provider.

Figure 1:
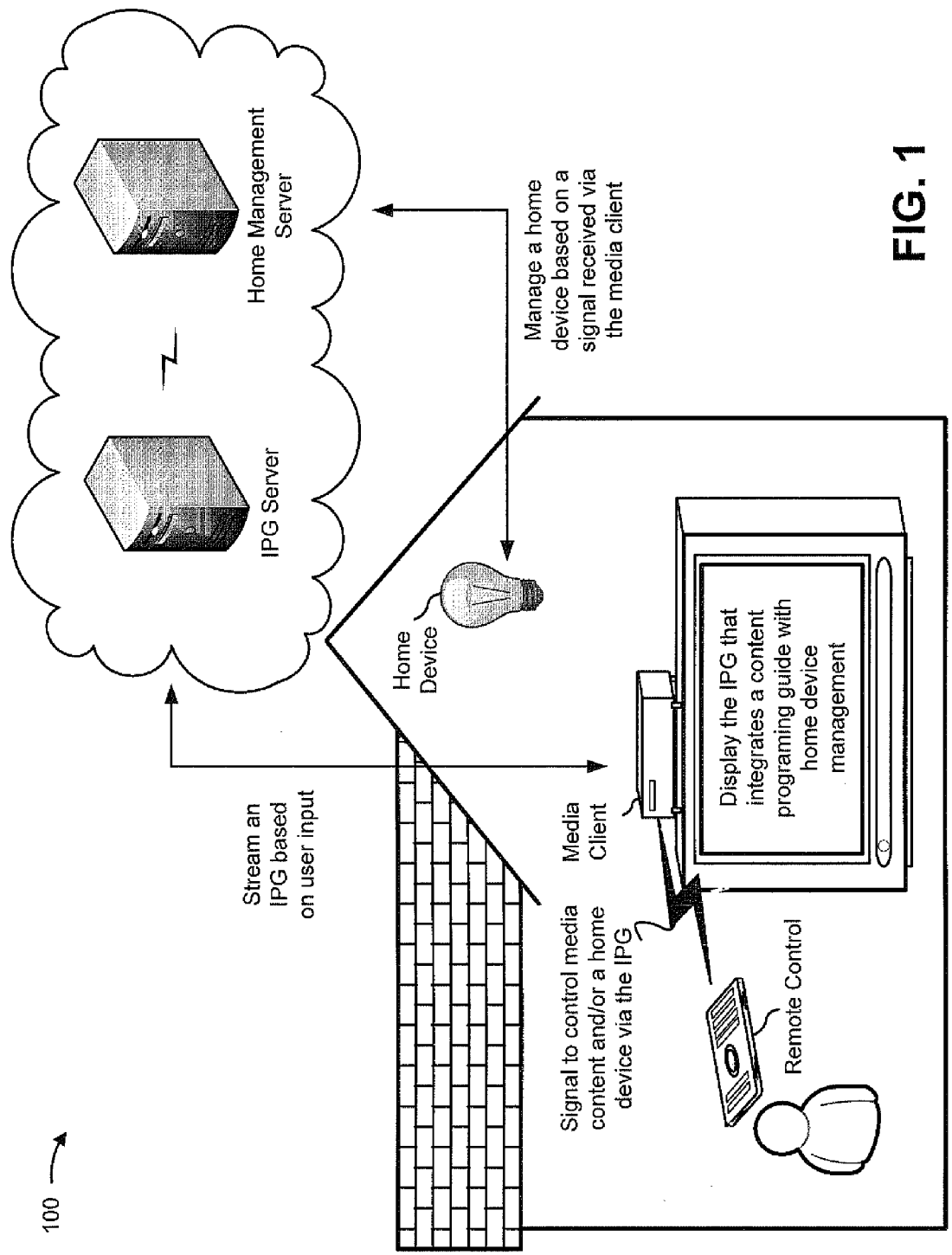
FIG. 1 is a diagram of an overview of an example implementation described herein.

FIG. 1 is a diagram of an overview of an example implementation described herein. Assume a service provider operates an IPG server and a home management server in a cloud environment for providing a media content service and a home automation service, respectively.

As shown in FIG. 1, an IPG server may stream an IPG to a media client. The media client may have a thin client application installed thereon that causes a display device to display the IPG (e.g., for a first page of a program guide).

A user may operate a remote control to send a signal to the media client indicating an input for navigating the IPG. For example, the user may send the media client a signal to "page up" (e.g., to move to a next page of the program guide). The media client may receive the signal and send information to the IPG server indicating the input. The IPG server may receive the information and send a different part of the IPG to the media client. For example, the different part of the IPG may be a second page of the program guide. The media client may receive the different part of the IPG and use the thin client application to display the different part of the IPG.

In this way, an IPG generated by the IPG server may be streamed in real time to the media client and a user may control the IPG via interaction with the media client.

Additionally, or alternatively, the user may operate a remote control to send a signal that identifies an input for managing a home device (e.g., a light bulb). For example, assume that the signal indicates a command to turn on the light bulb.

The media client may receive the signal and send information indicating the input to the IPG server. The IPG server may receive the information and generate a request to turn on the light bulb. The IPG server may send the request to the home management server that controls the home automation service. The home management server may send a command to the home device (e.g., the light bulb) instructing the home device to turn on. The home device may receive the command and execute the command (e.g., the light bulb may turn on). The home device may send a result of executing the command to the home management server. The home management server may receive the result and send the result to the IPG server. The IPG server may receive the result and send the result to the media client. The media client may receive the result and use the thin client application to display the result. For example, the display device may display information indicating that the light bulb is now turned on.

In this way, the IPG may be used to control a home device via a home automation service provided by the service provider in addition to controlling media content via a media content service provided by the service provider. In other words, an IPG may be expanded to not only provide access to a program guide for media content, but also provide access to information relating to the home automation service.

Figure 2:
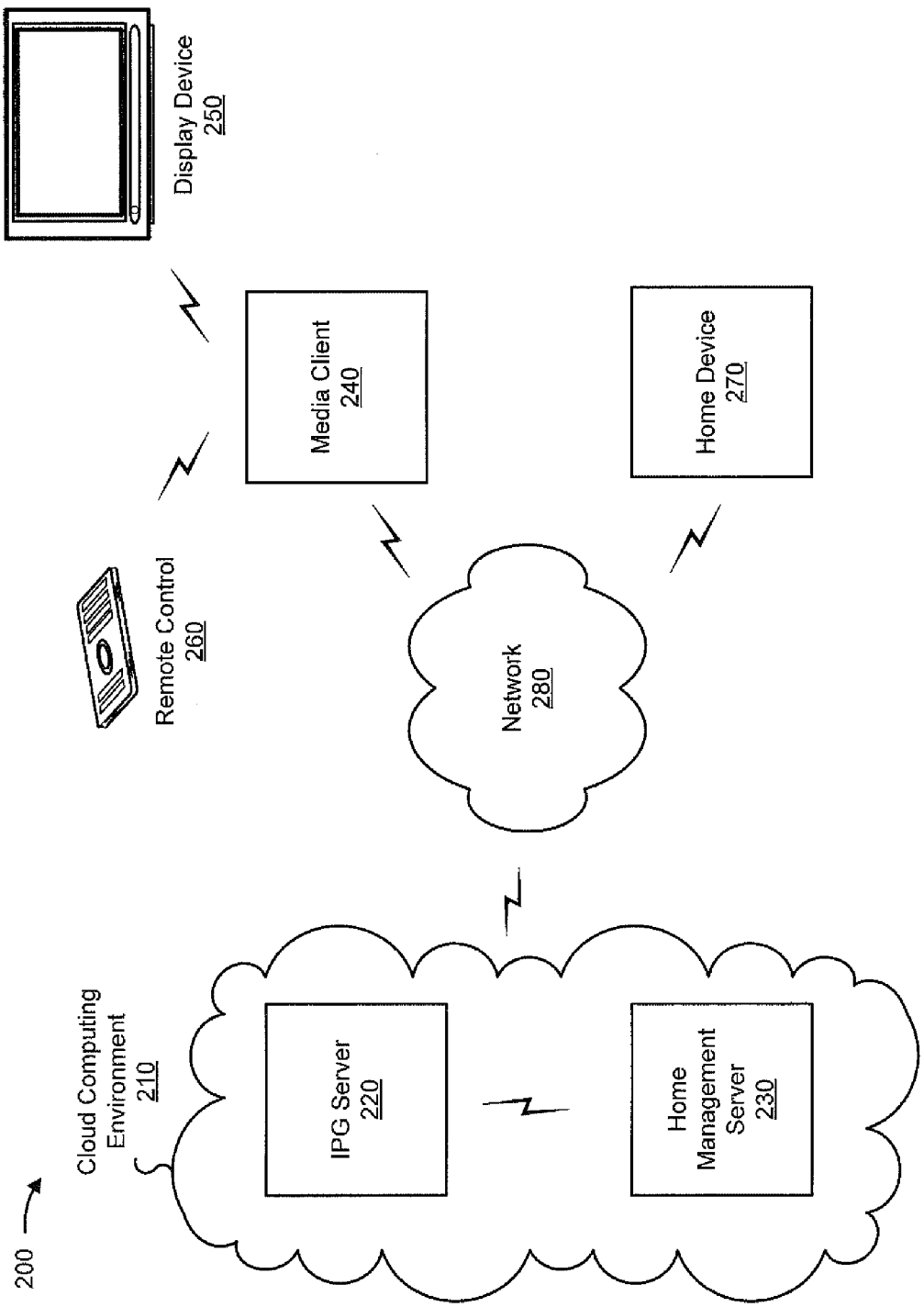
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a cloud computing environment 210, an IPG server 220, a home management server 230, a media client 240, a display device 250, a remote control 260, a home device 270, and/or a network 280.

Cloud computing environment 210 may include an environment that delivers computing as a service, whereby shared resources, services, etc. may be provided to media client 240 and/or home device 270. Cloud computing environment 210 may provide computation, software, data access, storage, and/or other services that do not require end-user knowledge of a physical location and configuration of a system and/or a device that delivers the services. As shown, cloud computing environment 210 may include IPG server 220 and/or home management server 230.

IPG server 220 may include one or more devices capable of processing, storing, and/or routing information. In some implementations, IPG server 220 may include a communication interface that allows IPG server 220 to receive information from and/or transmit information to other devices in environment 200. In some implementations, IPG server 220 may stream an IPG to one or more media clients 240. IPG server 220 may be dedicated to media clients 240 associated with a single household or a group of households.

Home management server 230 may include one or more devices capable of processing, storing, and/or routing information. In some implementations, home management server 230 may include a communication interface that allows home management server 230 to receive information from and/or transmit information to other devices in environment 200. In some implementations, home management server 230 may manage and/or control one or more home devices 270. Home management server 230 may be dedicated to home devices 270 associated with a single household or a group of households.

Media client 240 may include a device capable of receiving, transmitting, and/or processing multimedia content and providing the multimedia content to a user (e.g., via display device 250). Media client 240 may allow a user to provide input for an IPG (e.g., to navigate the IPG) and to alter programming and/or content provided by media client 240 based on a signal (e.g., a channel up or channel down signal) from, for example, remote control 260. Additionally, or alternatively, media client 240 may allow a user to provide input for the IPG using voice commands detected by a microphone and/or gestures detected by a motion capturing device (e.g., a camera). Examples of media client 240 may include a set-top box, a casting stick (e.g., a high-definition media interface (HDMI) dongle), a computer, a cable card, a gaming device, a portable electronic device, and/or other types of devices capable of receiving, transmitting, and/or processing multimedia content and providing the multimedia content to a user.

Display device 250 may include any digital or analog display that is capable of presenting audio and/or video content provided by media client 240. Display device 250 may include technologies, such as cathode ray tube (CRT) displays, liquid crystal displays (LCDs), light-emitting diode (LED) displays, plasma displays, etc. Examples of display device 250 may include a television, a projector, a computer monitor, and/or other types of devices capable of presenting audio and/or video content.

Remote control 260 may include a device that allows a user to control programming, applications, and/or content displayed on display device 250 via interaction with media client 240. Remote control 260 may transmit signals, such as, for example, infrared signals, to a signal receiver associated with media client 240. Remote control 260 may take the form of a standard remote, a keyboard, a smart phone, etc. Any function, described herein, as being performed by remote control 260, may be performed directly on media client 240 using, for example, one or more buttons on media client 240.

In some implementations, media client 240, display device 250, and/or remote control 260 may be incorporated into a single device. For example, media client 240, display device 250, and/or remote control 260 may be incorporated into a mobile phone (e.g., a smart phone, a radiotelephone, etc.), a desktop computer, a laptop computer, a tablet computer, a handheld computer, a gaming device, and/or a similar device.

Home device 270 may include a device capable of being remotely controlled to perform a function. In some implementations, home device 270 may be a device that participates in home monitoring or automation. For example, home device 270 may include an appliance (e.g., a refrigerator, a microwave, a stove, etc.), a medical device, a home security system, a security camera, a car, a light bulb, a door lock, a gas meter, a water heater, a sump pump, a thermostat, a solar energy panel, a pet feeder, and/or other types of smart devices. In other words, home device 270 may be any "thing" in the Internet of Things. In some implementations, home device 270 may include a communication interface that allows home device 270 to receive information from and/or transmit information to another device in environment 200. Home device 270 may or may not be located in a home or a house.

Network 280 may include one or more wired and/or wireless networks. For example, network 280 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 280 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

FIG. 3 is a diagram of example components of a device 300 that corresponds to one or more devices of FIG. 2. Device 300 may correspond to IPG server 220, home management server 230, media client 240, display device 250, remote control 260, and/or home device 270. Additionally, or alternatively, IPG server 220, home management server 230, media client 240, display device 250, remote control 260, and/or home device 270 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, a microphone, etc.). In some implementations, input component 340 may include a sensor for sensing information (e.g., a camera, a GPS device, etc.).

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4A:
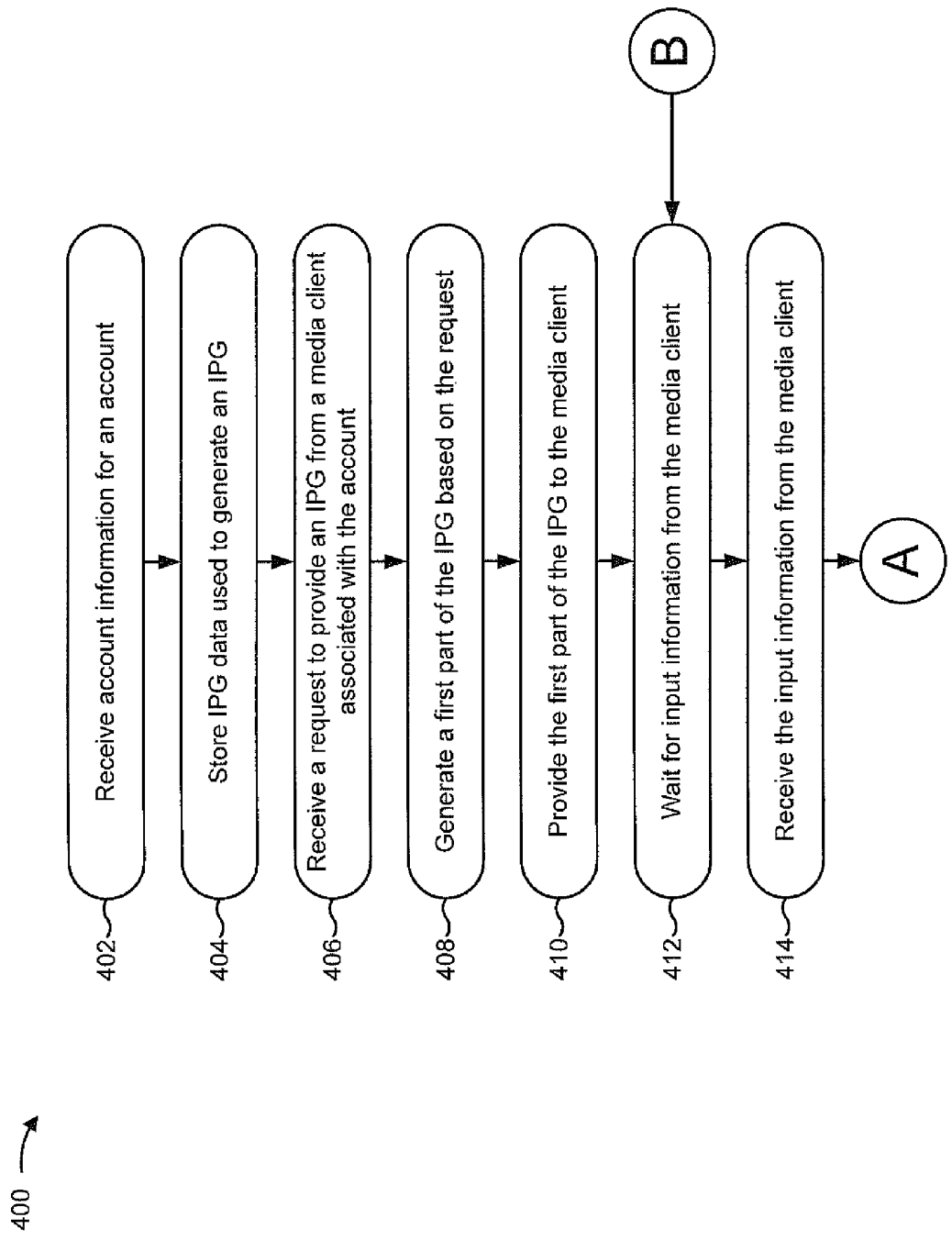
FIGS. 4A and 4B are flowcharts of an example process for interacting with an IPG.
Figure 4B:
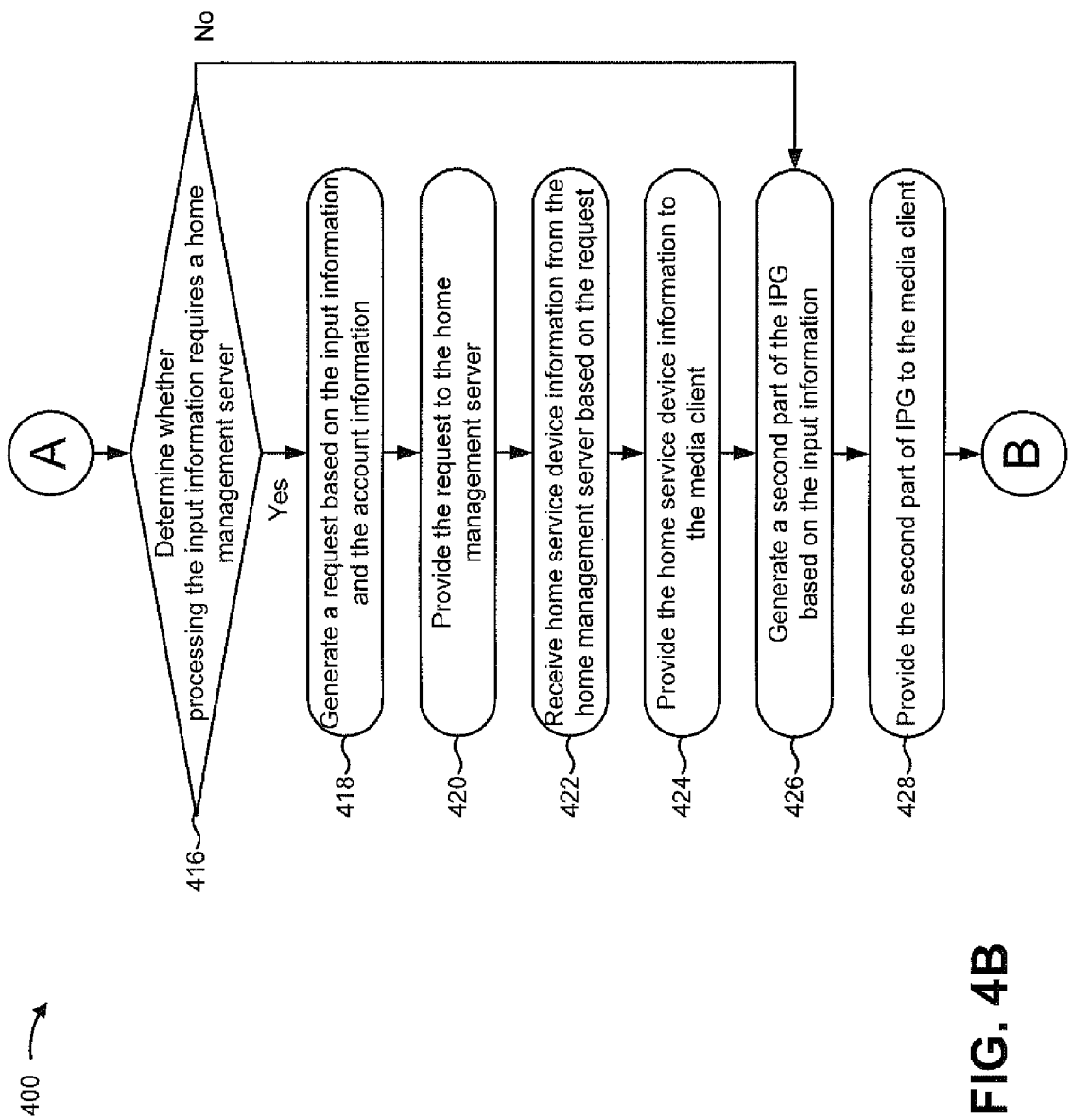

FIGS. 4A and 4B are flowcharts of an example process 400 for interacting with an IPG. In some implementations, one or more process blocks of FIGS. 4A and 4B may be performed by IPG server 220. Additionally, or alternatively, one or more process blocks of FIGS. 4A and 4B may be performed by another device or a group of devices separate from or including IPG server 220, such as home management server 230, media client 240, display device 250, remote control 260, and/or home device 270.

As shown in FIG. 4A, process 400 may include receiving account information for an account (block 402). For example, IPG server 220 may receive the account information from a service provider.

A service provider may include an Internet service provider, a cable television service provider, a satellite television service provider, a mobile network operator, a wireless service provider, and/or a similar service provider. A user may have an account with the service provider to provide media content via media client(s) 240 and/or to manage home device(s) 270 associated with the user. In some implementations, the service provider may operate IPG server 220 and/or home management server 230.

The service provider may send account information for an account to IPG server 220. IPG server 220 may receive the account information and store the account information in a memory included in IPG server 220 and/or in a memory accessible by IPG server 220. The account information may identify content associated with the account (e.g., TV stations, video-on-demand (VOD) programs, home automation services, gaming services, etc.). In some implementations, the account information may identify one or more media clients 240 associated with the account. For example, the account information may include a media client identifier (ID) that uniquely identifies a media client 240 authorized to access content using the account. Additionally, or alternatively, the account information may identify one or more home devices 270 associated with the account. For example, the account information may include a home device ID that uniquely identifies a home device 270 associated with the account. In some implementations, the account information may include authentication information (e.g., a password and/or a personal identification number (PIN)) used to authenticate access to one or more home devices 270, associated with the account, via home management server 230.

As further shown in FIG. 4A, process 400 may include storing IPG data used to generate an IPG (block 404). For example, IPG server 220 may store the IPG data.

The IPG data may include interface information used to generate an interface for an IPG. For example, the interface information may include information about menus to be displayed in the IPG. Additionally, or alternatively, the IPG data may include schedule information indicating a schedule or a program guide for content. For example, the schedule or the program guide may indicate which broadcast content will be played on certain channels at certain times and/or which VOD content is offered via a VOD service. In some implementations, the IPG data may include content metadata indicating information about content to be played (e.g., content to be played on a channel and/or via the VOD service). For example, the content metadata may identify a content name, a content description, actor information, production information, etc.

The IPG data may be used to generate an IPG that allows a user of media client 240 to navigate interfaces interactively to obtain information, to obtain content, and/or to manage home device(s) 270.

For example, IPG server 220 may generate an IPG that presents information about content (e.g., TV shows, movies, etc.) that is scheduled to be available on different channels. The IPG may include a program schedule including information on scheduled content for a certain amount of time in the future (e.g., a day, a week, a month, etc.). Additionally, or alternatively, the IPG may provide information on VOD programs that are available. Moreover, the IPG may provide an interface used to select content to be viewed from among the scheduled content and the VOD content. For example, the IPG may not only present information about a TV show (e.g., information on what channel the TV show is available), but may also allow the TV show to be selected for viewing.

In some implementations, the IPG may present information about one more home devices 270. For example, the IPG may identify which home devices 270 may be controlled and/or managed via the IPG. Moreover, the IPG may provide an interface used to obtain information about a home device 270 and/or to input a command to be executed by home device 270.

IPG server 220 may store the IPG data in a memory of IPG server 220 and/or a memory accessible by IPG server 220. IPG server 220 may continually update the IPG data based on newly received IPG data from a content provider and/or home management server 230 (e.g., new program schedules, new VOD programs, etc.).

As further shown in FIG. 4A, process 400 may include receiving a request to provide an IPG from a media client 240 associated with the account (block 406). For example, IPG server 220 may receive the request from media client 240.

In some implementations, a user may use remote control 260 to send a signal to turn on media client 240 and/or wake media client 240 from a sleep state. Media client 240 may receive the signal from remote control 260. Media device 240 may turn on and/or wake from the sleep state based on the signal. Additionally, or alternatively, a user may use remote control 260 to send a signal related to any kind of input and media device 240 may receive the signal.

Media client 240 may generate a request to provide the IPG based on receiving the signal. The request may include a media client ID that uniquely identifies media client 240. Media client 240 may send the request to IPG server 220 via network 280 and IPG server 220 may receive the request.

As further shown in FIG. 4A, process 400 may include generating a first part of the IPG based on the request (block 408). For example, IPG server 220 may generate the first part of the IPG.

IPG server 220 may obtain a first part of the IPG data based on the request. A part of the IPG data may not be the entire IPG data. For example, a part of the IPG data may indicate a single menu and/or a part of a menu. For instance, a part of the IPG data may indicate part of the program schedule, but not the entire program schedule.

IPG server 220 may generate the first part of the IPG based on the first part of the IPG data. Each part of the IPG may be a different view and/or page of the IPG to be displayed. In some implementations, the first part of the IPG may include a main menu. Additionally, or alternatively, the first part of the IPG may be a most recently provided part of the IPG that was previously sent to media client 240.

As further shown in FIG. 4A, process 400 may include providing the first part of the IPG to media client 240 (block 410). For example, IPG server 220 may provide the first part of the IPG to media client 240 as a video stream. In some implementations, before providing the first part of the IPG, IPG server 220 and media client 240 may establish a connection channel via which a part of the IPG (e.g., the first part) is to be streamed. Furthermore, before providing the first part of the IPG, IPG server 220 may format and/or encode the first part of the IPG based on which media client 240 the first part of the IPG is to be provided.

Media client 240 may receive the first part of the IPG from IPG server 220. Media client 240 may use a thin client application installed on media client 240 to display the first part of the IPG on display device 250. The thin client application may be an application used to display an IPG based on streamed data. For example, the thin client application may include a Hypertext Markup Language (HTML) player, a HTML5 player, a JavaScript video player, a hypertext transfer protocol (HTTP) live streaming (HLS) player, and/or a similar streaming service player.

As further shown in FIG. 4A, process 400 may include waiting for input information from media client 240 (block 412). For example, IPG server 220 may wait for input information from media client 240.

The user may use remote control 260 to send an input signal to media client 240. The input signal may indicate an input used to navigate the IPG and/or input a command. For example, the input may be to select a command displayed by the IPG, to scroll up, to scroll down, to change menus, to move a cursor, to remove a menu, to navigate to live content, etc. Media client 240 may receive the input signal from remote control 260. Media device 240, using the thin client application, may generate input information based on the input signal. The input information may include information identifying the input and/or the selected command. Media client 240 may send the input information to IPG server 220 while IPG server 220 is waiting for the input information.

As further shown in FIG. 4A, process 400 may include receiving the input information from media client 240 (block 414). For example, IPG server 220 may receive the input information sent by media client 240 as described above.

As shown in FIG. 4B, process 400 may include determining whether processing the input information requires accessing home management server 230 (block 416). For example, IPG server 220 may determine whether processing the input information requires accessing home management server 230.

In some implementations, processing the input information may require accessing home management server 230 if the input information corresponds to a command to be executed by home device 270, corresponds to retrieving information about home device 270, and/or corresponds to retrieving information from home device 270.

If IPG server 220 determines processing the input information requires accessing home management server 230 (block 416—yes), process 400 may advance to block 418. If IPG server 220 determines processing the input information does not require accessing home management server 230 (block 416—no), process 400 may advance to block 426.

As further shown in FIG. 4B, if processing the input information requires accessing home management server 230 (block 416—yes), process 400 may include generating a request based on the input information and the account information (block 418). For example, IPG server 220 may generate the request based on the input information and a home device ID included in the account information.

The request may include a request for general information related to home device 270, a request for a command to be executed by home device 270, and/or a request for status information related to home device 270. Additionally, or alternatively, the request may include one or more home device IDs identifying one or more home devices 270 related to the request.

In some implementations, the request may include a request for general information about home device 270. The general information may include information about commands home device 270 is capable of executing. For instance, at block 412, assume the part of the IPG data provided to media client 240 includes a menu listing home devices 270 that may be controlled and/or managed. The user may use remote control 260 to select a home device 270 (e.g., a door lock) and IPG server 220 may receive input information identifying the selected home device 270 at block 414. The next part of the IPG data to be sent to media client 240 may include information for presenting commands that may be executed by the selected home device 270 and/or other information about the selected home device 270. However, IPG server 220 may not store information indicating which commands are executable by the selected home device 270. Accordingly, IPG server 220 may generate a request that requests general information about the selected home device 270 (e.g., information on which commands are executable by the selected home device 270).

In some implementations, the request may include a request for a command to be executed by home device 270. For instance, at block 412, assume the part of the IPG data provided to media client 240 includes a menu listing commands that may be executed by home device 270 (e.g., zoom-in on a security camera, change the temperature on a thermostat, unlock a lock on a door, dispense food from a pet feeder, turn on a light bulb, turn off an oven, etc.). The user may use remote control 260 to select a command and IPG server 220 may receive input information identifying the selected command at block 414. Accordingly, IPG server 220 may generate a request that identifies the command to be executed by home device 270.

In some implementations, the request may include a request to obtain status information for home device 270. The status information may indicate a state of operation of the selected home device 270. For example, the status information may indicate a garage door is open or closed, a lock is locked or unlocked, a light is on or off, a temperature sensed by a thermostat, a video recorded by a security camera, an alert, etc.

As further shown in FIG. 4B, process 400 may include providing the request to home management server 230 (block 420). For example, IPG server 220 may send the request to home management server 230.

In some implementations, IPG server 220 may authenticate a user of media client 240 before sending the request to home management server 230. For example, IPG server 220 may send an instruction to media client 240 that causes media client 240 to prompt the user to input authentication information (e.g., a password, a username, and/or a PIN). A user may input the authentication information (e.g., using remote 260) into media client 240 and media client 240 may send the authentication information to IPG server 220. IPG server 220 may receive the authentication information and compare the received authentication information with authentication information included in the account information associated with media client 240. Additionally, or alternatively, IPG server 220 may send the received authentication information to another device to perform authentication. If the received authentication information does not match the authentication information included in the account information, IPG server 220 may not send the request to home management server 230. If the received authentication information matches the authentication information included in the account information, IPG server 220 may send the request to home management server 230. Home management server 230 may receive the request sent from IPG server 220 and process the request.

In some implementations, home management server 230 may periodically gather general information from home device 270. Additionally, or alternatively, home management server 230 may gather the general information from home device 270 in response to receiving the request from IPG server 220. For example, home management server 230 may gather the general information from home device 270 by sending a request to home device 270. Home server device 270 may receive the request and send the general information to home management server 230. Home management server 230 may store the general information in a data structure in a memory of home management server 230 and/or a memory accessible by home management server 230. The general information may be associated with a home device ID in the data structure.

In some implementations, the request that home management server 230 receives from IPG server 220 may be a request to provide general information. Home management server 230 may query the data structure using the home device ID included in the request to obtain the associated general information.

In some implementations, the request that home management server 230 receives from IPG server 220 may be a request to provide status information. In such a case, home management server 230 may send an instruction to home device 270, based on the home device ID included in the request, requesting the status information. Home server device 270 may receive the instruction and send the status information to home management server 230. In some implementations, the status information may be a live stream of data from home device 270 (e.g., a live video from a security camera, a live update on an operation state of home device 270, etc.).

In some implementations, the request that home management server 230 receives from IPG server 220 may include a request for a command to be executed by home device 270. In such a case, home management server 230 may send a command, corresponding to the requested command, to home device 270 based on the home device ID included in the request. Home device 270 may receive the command and execute the command (e.g., zoom-in on a security camera, change the temperature on a thermostat, unlock a lock on a door, dispense food from a pet feeder, turn on a light bulb, turn off an oven, etc.). Home device 270 may send execution information to home management server 230 indicating a result of executing the command.

Home management server 230 may generate home device information including the general information, the status information, and/or the execution information relating to one or more home devices 270. Home management server 230 may send the home device information to IPG server 220 in response to the request.

As further shown in FIG. 4B, process 400 may include receiving the home device information from home management server 230 based on the request (block 422). For example, IPG server 220 may receive the home device information, sent by home management server 230, in response to the request.

As further shown in FIG. 4B, process 400 may include providing the home device information to media client 240 (block 424). For example, IPG server 220 may send the home device information to media client 240 as a video stream. Before providing the home device information, IPG server 220 may format and/or encode the home device information based on which media client 240 the home device information is to be provided.

Media client 240 may receive the home device information sent by IPG server 220. Media client 240 may use the thin client application to cause the home device information to be displayed on display device 250. The display of the home device information may be integrated with the IPG displayed by display device 250. Additionally, or alternatively, the display of the home device information may be separate from and/or independent from the IPG displayed by display device 250.

As further shown in FIG. 4B, process 400 may include generating a second part of the IPG based on the input information (block 426). For example, IPG server 220 may generate the second part of the IPG. The second part of the IPG may be a different view of the IPG than the first part of the IPG.

IPG server 220 may determine that a second part of the IPG needs to be provided to media client 240 based on the user input. For example, the input information may indicate a page up or page down input, a cursor movement input, a menu selection input, or the like that requires a second part of the IPG be displayed on display device 250. Thus, the second part of the IPG may represent a different page or menu of the IPG than the first part of the IPG. In some implementations, the first part of the IPG and the second part of the IPG may include some of the same information and/or a same view. In some implementations, the second part of the IPG may just be an updated version of the first part of the IPG. For example, the second part of the IPG may have a cursor in a different position than the first part of the IPG based on an input to move the cursor.

IPG server 220 may obtain a second part of the IPG data based on the input information and the first part of the IPG data used to generate the first part of the IPG. For example, if the input information indicates a page down input, IPG server 220 may obtain IPG data for a page of the IPG down from the page of the IPG provided in the first part of the IPG. IPG server 220 may generate the second part of the IPG based on the second part of the IPG data.

In some implementations, the second part of the IPG may be based on the account information. For example, the account information may identify the content available via the account (e.g., TV stations, video-on-demand (VOD) programs, etc.). IPG server 220 may only obtain IPG data for content available via the account. Thus, IPG server 220 may generate personalized IPGs for each account that will not include information unrelated to the account. For example, the second part of the IPG may only include channel information for channels available via the account.

In some implementations, the input information may cause IPG server 220 to generate the second part of the IPG and receive the home device information at block 422. In such a case, IPG server 220 may add the home device information into the second part of the IPG such that the home device information and the second part of the IPG may be presented together.

As further shown in FIG. 4B, process 400 may include providing the second part of the IPG to media client 240 (block 428). For example, IPG server 220 may provide the second part of the IPG to media client 240 as a video stream. Before providing the second part of the IPG data, IPG server 220 may format and/or encode the second part of the IPG based on which media client 240 the second part of the IPG is to be provided.

Media client 240 may receive the second part of the IPG from IPG server 220. Media client 240 may use the thin client application installed on media client 240 to display the second part of the IPG on display device 250.

Process 400 may return to block 412, after block 428 is completed to wait for new input information from media client 240. In this way, parts of the IPG may be streamed in real time to media client 240 based on user inputs.

In some implementations, IPG server 220 may send a multicast of the parts of the IPG sent to media client 240 to other media clients 240. For example, a user may use a smart phone (e.g., media client 240) to input selections for the IPG and IPG server 220 may send the smart phone parts of the IPG to display on a screen of the smart phone. IPG server 220 may simultaneously send the same parts of the IPG to a set-top box (e.g., media client 240) to display the parts of the IPG on a TV connected to the set-top box. In this way, a user may control the IPG using the phone and see the same IPG on the TV.

While a series of blocks has been described with regard to FIGS. 4A and 4B, the blocks and/or the order of the blocks may be modified in some implementations. Additionally, or alternatively, non-dependent blocks may be performed in parallel.

Furthermore, while process 400 described with regard to FIGS. 4A and 4B describes an IPG that integrates a content programming guide with home device management using a thin client application installed on media client 240, a thick client application may also be used to integrate the content programming guide with the home device management. A thick client application may be an application used to display an IPG based on IPG data stored by media client 240 (e.g., a day's worth of IPG data, a week's worth of IPG data, etc.). A media client 240 using a thick client application may store all IPG data for a certain time period in a memory of media client 240, rather than IPG server 220 storing all the IPG for the certain time period. Thus, rather than having parts of the IPG provided to media client 240 in real time based on user input, media client 240 may generate the IPG locally based on the stored IPG data. Media client 240 may still allow a user to manage home devices 270 via an IPG using the thick client application. For example, media client 240 may send input information, which requires processing by home management server 230, to IPG server 220 as described at block 412. IPG server 220 may then perform process 400 as described at block 418 to block 424 to provide media client 240 with home device information to be displayed.

Figure 5A:
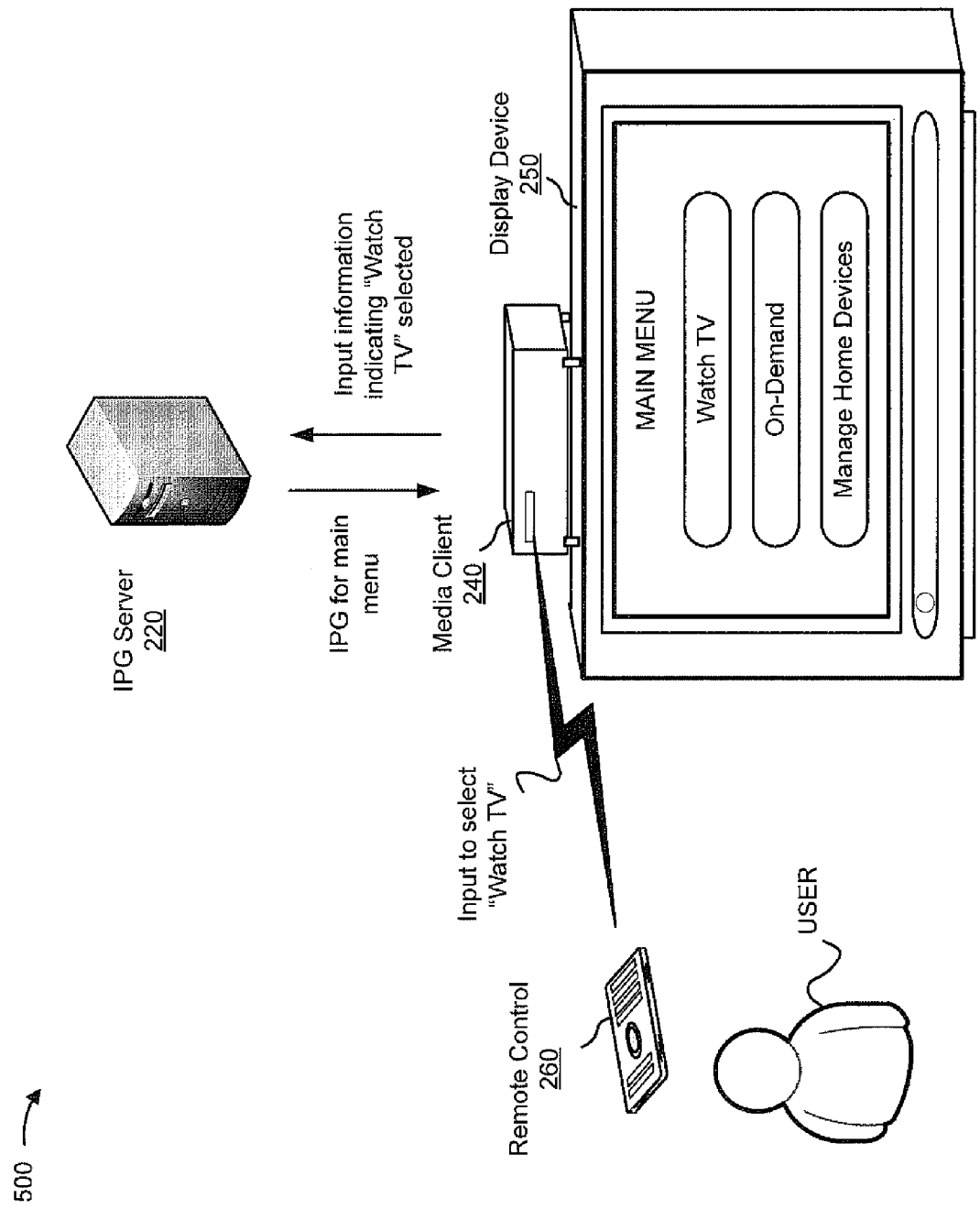
Figure 5B:
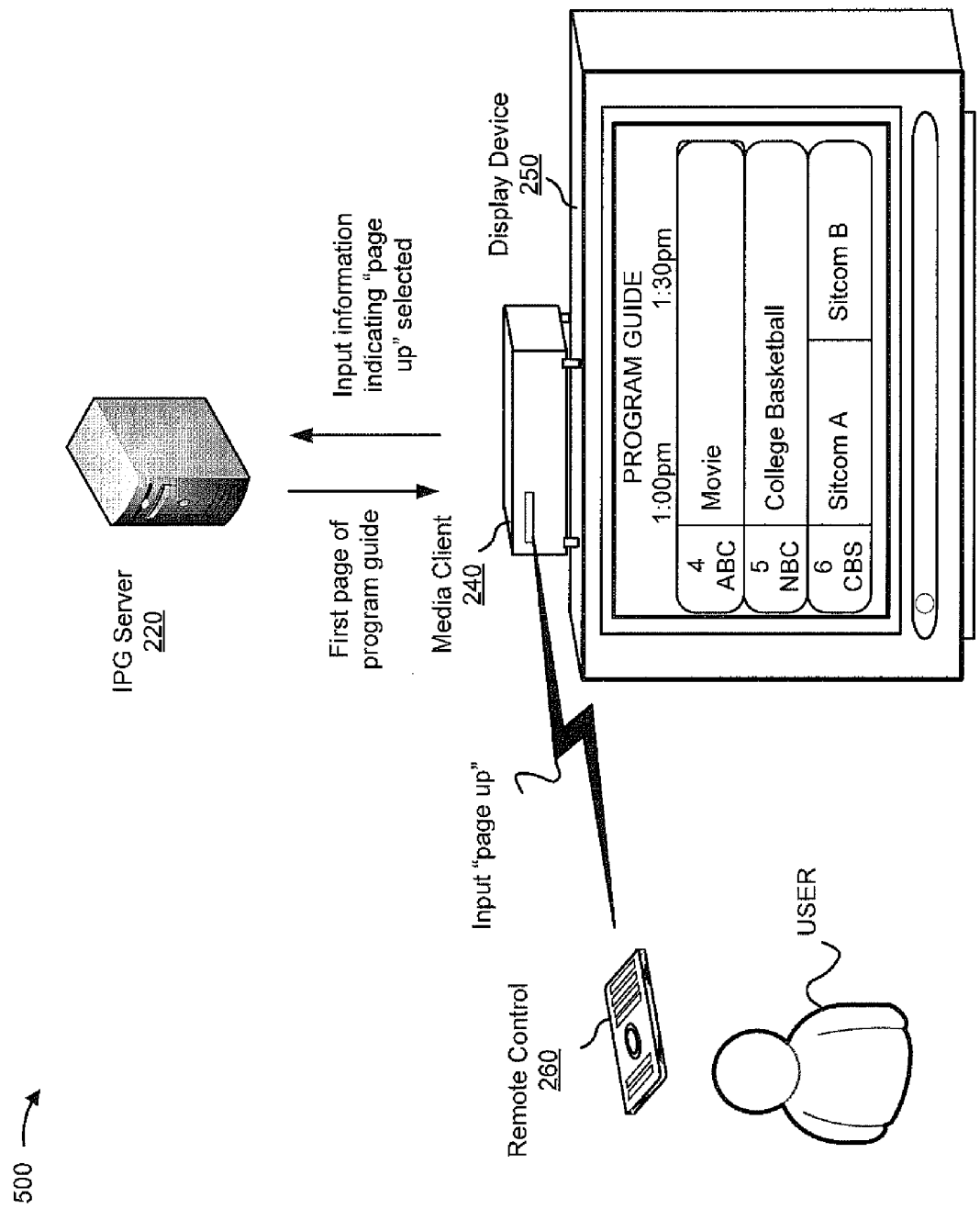

FIGS. 5A-5C are diagrams of an example implementation 500 relating to process 400 shown in FIGS. 4A and 4B.

In example implementation 500, assume IPG server 220 stores IPG data that may be used to stream an IPG to media client 240 in real time. As shown in FIG. 5A, IPG server 220 may send a first part of the IPG (e.g., a part for a main menu) to media client 240. Media client 240 may receive the first part of the IPG and use a thin client application to cause display device 250 to display the main menu. Assume that the main menu gives a user an option to select "Watch TV," "On-Demand," and "Manage Home Devices."

The user may use remote control 260 to send a signal to media client 240 to select "Watch TV" from the main menu. Media client 240 may receive the signal and generate input information indicating that "Watch TV" was selected. Media client 240 may send the input information to IPG server 220.

IPG server 220 may receive the input information and generate a second part of the IPG based on the input information. For example, IPG may generate a first page of a program guide as the second part of the IPG.

As shown in FIG. 5B, IPG server 220 may send the first page of the program guide to media client 240. Media client 240 may receive the first page of the program guide and use the thin client application to cause display device 250 to display the first page of the program guide (e.g., a page for channels 4-6).

The user may use remote control 260 to send a signal to media client 240 to input a "page up" command. Media client 240 may receive the signal and generate input information indicating that "page up" is selected. Media client 240 may send the input information to IPG server 220.

IPG server 220 may receive the input information and generate a third part of the IPG based on the input information. For example, IPG may generate a second page of the program guide as the third part of the IPG.

As shown in FIG. 5C, IPG server 220 may send the second page of the program guide to media client 240. Media client 240 may receive the first page of the program guide and use the thin client application to cause display device 250 to display the second page of the program guide (e.g., a page for channels 7-9). This process of media client 240 receiving inputs from a user, media client 240 sending input information to IPG server 220, and IPG server 220 sending parts of the IPG to media client 240 for display may be repeated as necessary to allow a user to navigate the IPG on media client 240.

Accordingly, IPG server 220 may store IPG data and stream an IPG in parts to media client 240 based on user inputs to media client 240.

As indicated above, FIGS. 5A-5C are provided merely as an example. Other examples are possible and may differ from what was described with regard to FIGS. 5A-5C.

FIGS. 6A-6E are diagrams of an example implementation 600 relating to process 400 shown in FIGS. 4A and 4B.

In example implementation 600, assume IPG server 220 stores IPG data that may be used to stream an IPG to media client 240. Further, assume the IPG data is for generating an IPG that integrates control of a service for providing media content and control of a home automation service.

Figure 6A:
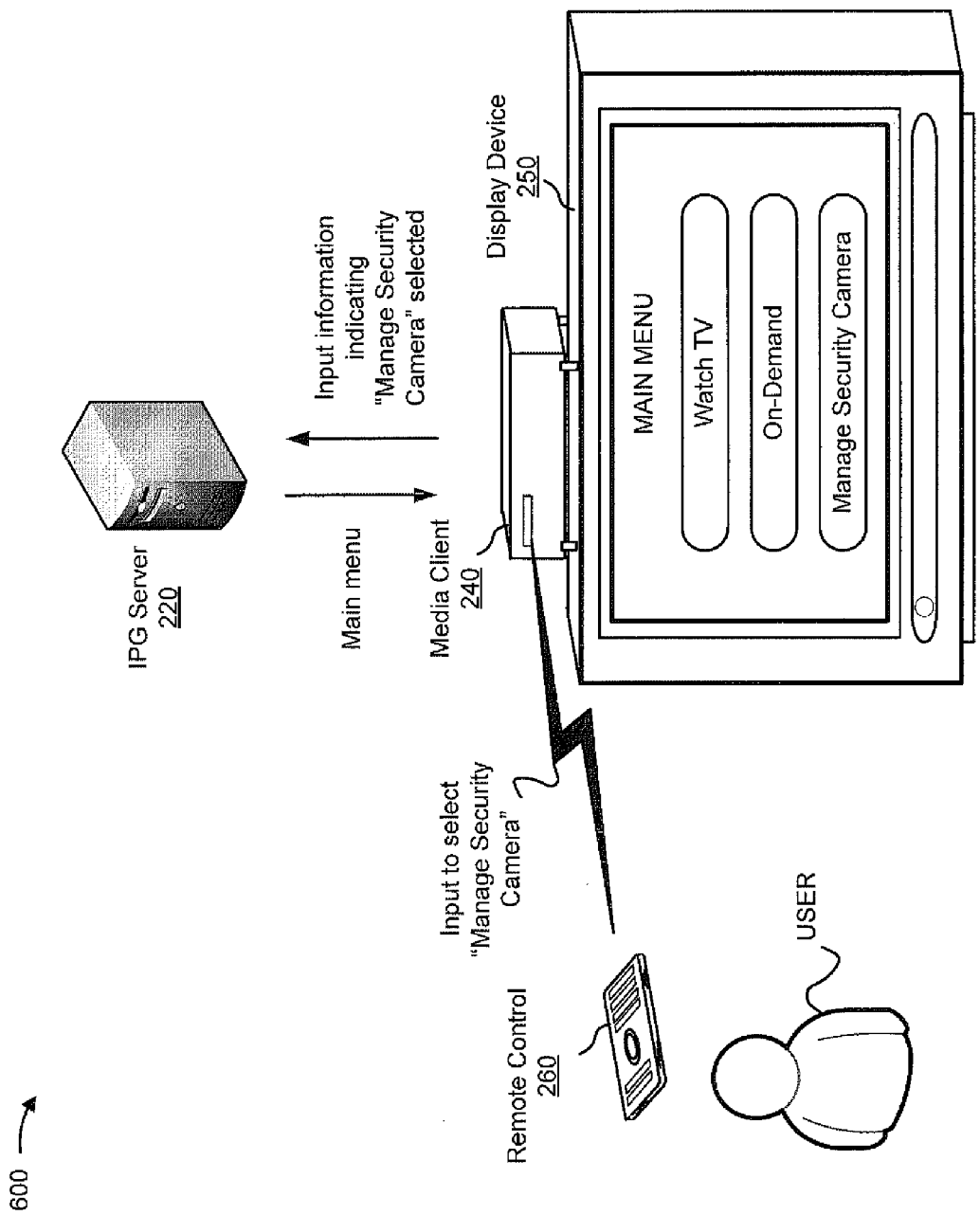
FIGS. 6A-6E are diagrams of an example implementation relating to the process shown in FIGS. 4A and 4B.

As shown in FIG. 6A, IPG server 220 may send a first part of the IPG (e.g., a part for a main menu) to media client 240. Media client 240 may receive the first part of the IPG and use the thin client application to cause display device 250 to display the main menu. Assume that the main menu gives a user an option to select "Watch TV," "On-Demand," and "Manage Security Camera."

The user may use remote control 260 to send a signal to media client 240 to select "Manage Security Camera" from the main menu. Media client 240 may receive the signal and generate input information indicating that "Manage Security Camera" was selected. Media client 240 may send the input information to IPG server 220 and IPG server 220 may receive the input information.

Figure 6B:
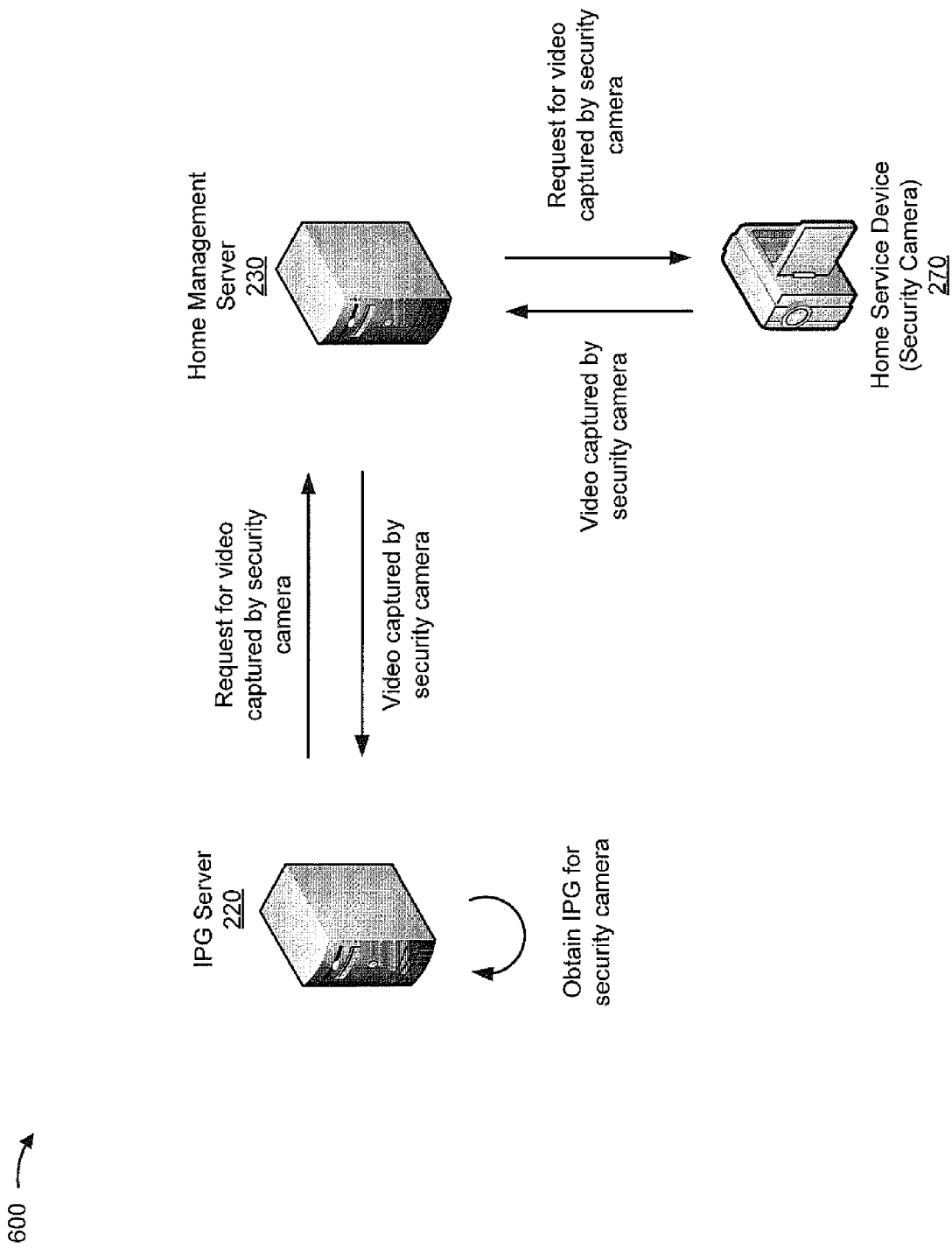

As shown in FIG. 6B, IPG server 220 may generate a request for video captured by the security camera and send the request to home management server 230. Home management server 230 may receive the request and send the request to the security camera. The security camera may receive the request and provide video captured by the security camera to home management server 230 in response to the request. Home management server 230 may send the video captured by the security camera to IPG server 220 and IPG server 220 may receive the video captured by the security camera.

IPG server 220 may generate a second part of the IPG based on the input information. For example, IPG may generate a menu for operating the security camera as the second part of the IPG data.

Figure 6C:
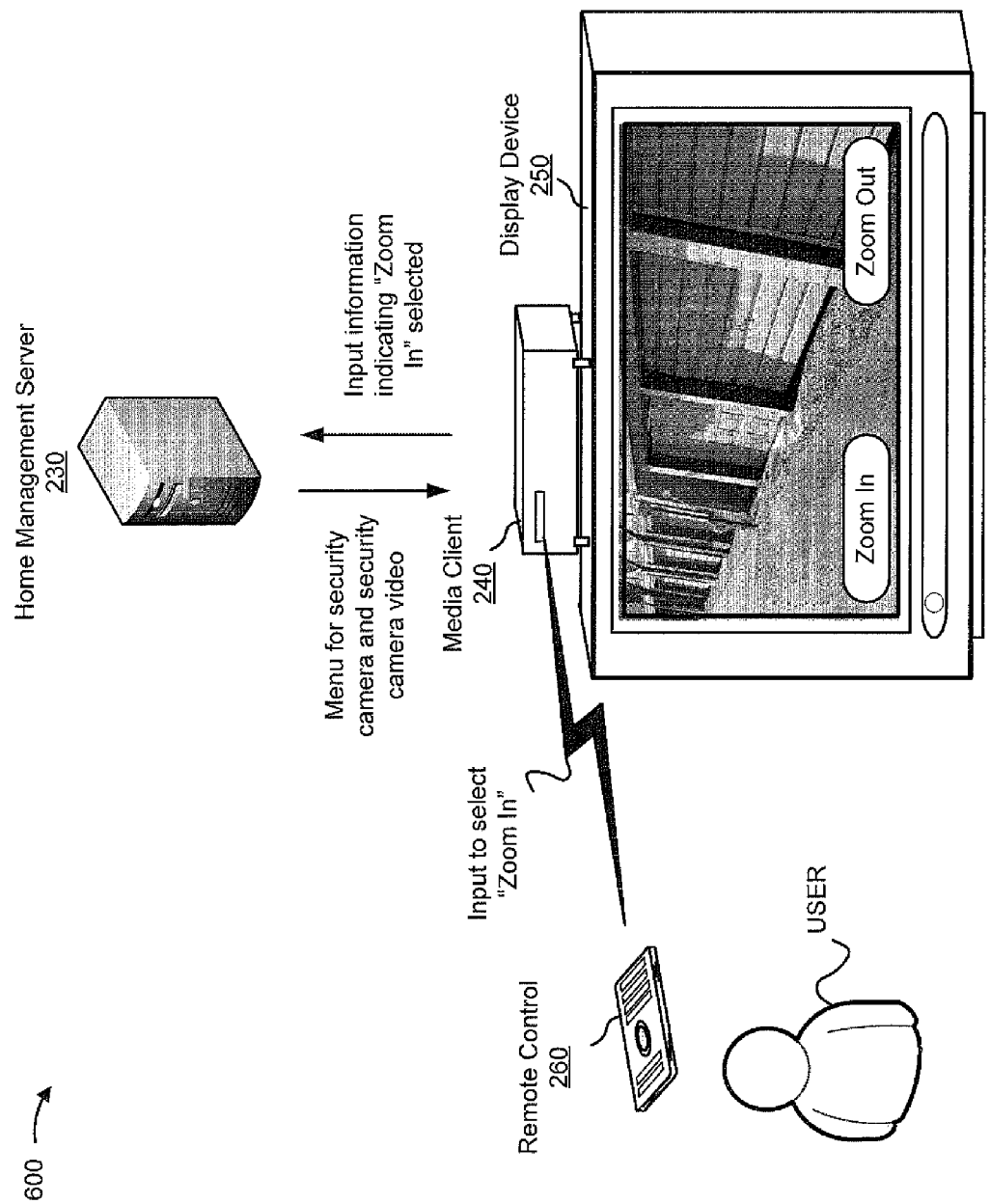

As shown in FIG. 6C, IPG server 220 may send the menu for operating the security camera and the video captured by the security camera to media client 240. Media client 240 may receive the menu and the video, and use the thin client application to cause display device 250 to display the menu and the video. For example, assume that the menu displays options to "zoom in" and "zoom out."

Assume that the user uses remote control 260 to send a signal to media client 240 indicating "zoom in" is selected. Media client 240 may receive the signal and generate input information indicating that "zoom in" is selected. Media client 240 may send the input information to IPG server 220 and IPG server 220 may receive the input information.

Figure 6D:
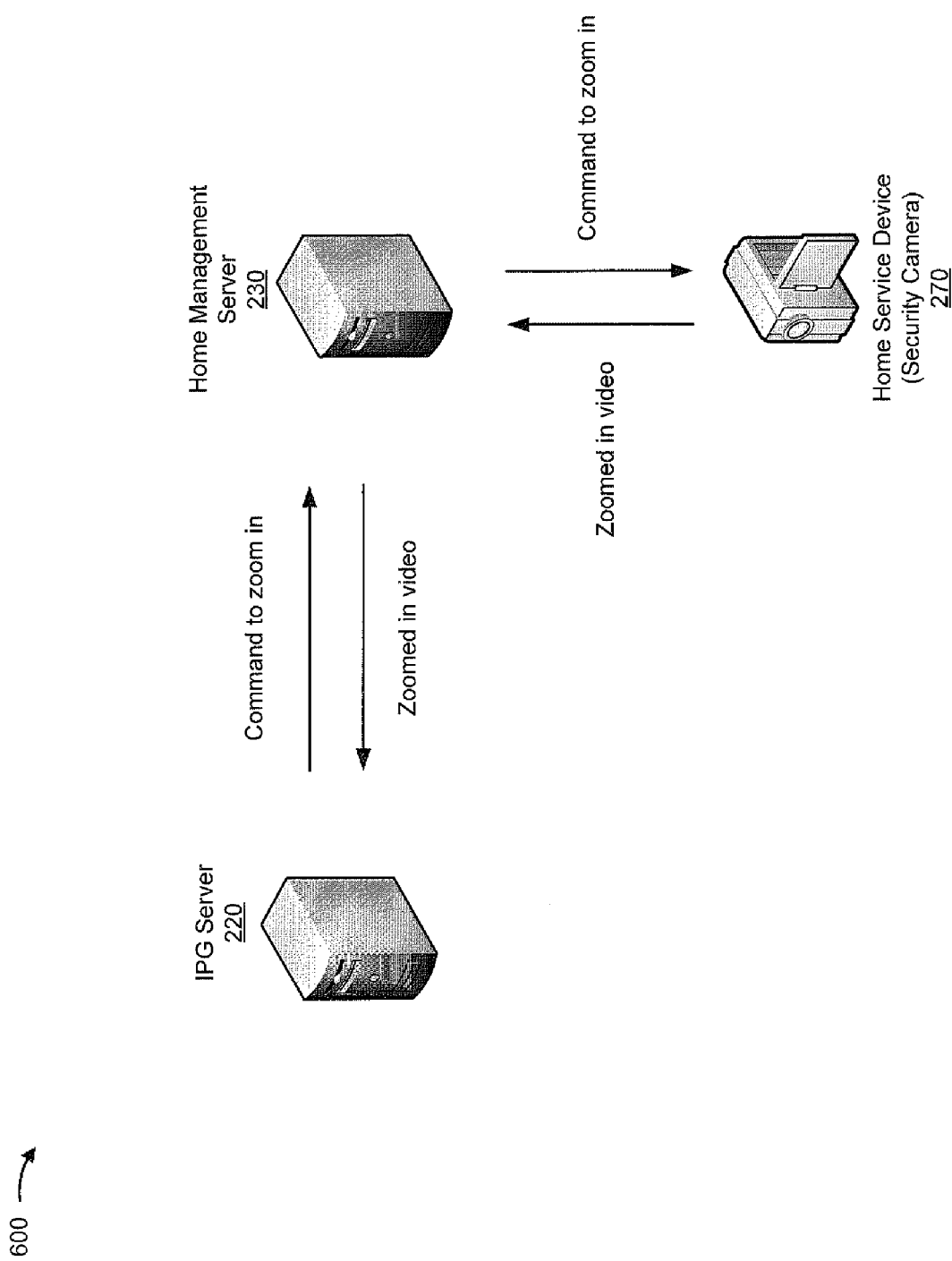

As shown in FIG. 6D, IPG server 220 may generate a command for the security camera to zoom in and send the command to home management server 230. Home management server 230 may receive the command and send the command to the security camera. The security camera may receive the command and execute the command by zooming in. Security camera may provide the zoomed in video captured by the security camera to home management server 230 in response to the command. Home management server 230 may send the zoomed in video to IPG server 220 and IPG server 220 may receive the zoomed in video.

Figure 6E:
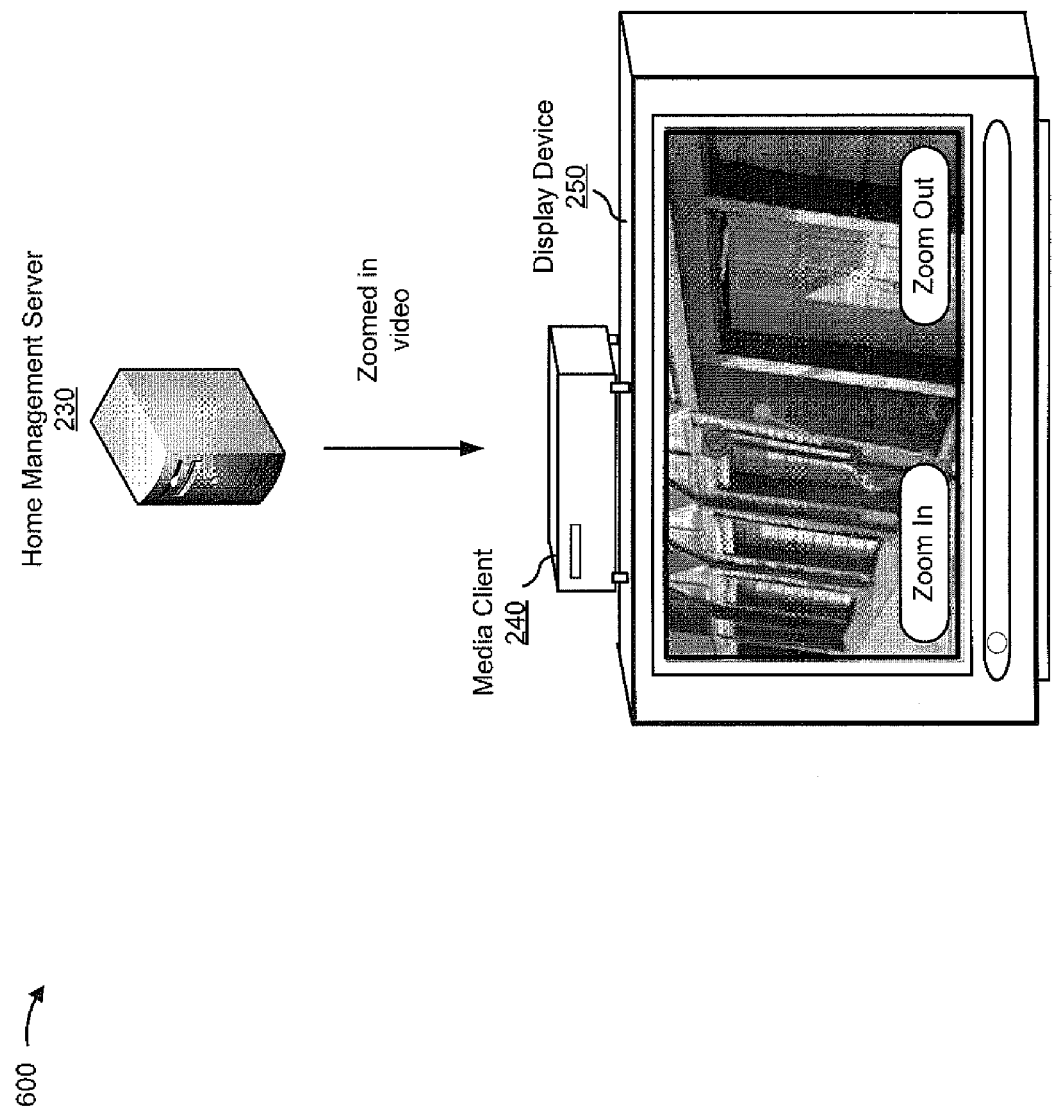

As shown in FIG. 6E, IPG server 220 may send the zoomed in video to media client 240. Media client 240 may receive the zoomed in video and use the thin client application to cause display device 250 to display the zoomed in video.

In this way, a user may use an IPG provided on a media client 240 (e.g., a set-top box) to control and receive information about a home device 270 (e.g., a security camera).

As indicated above, FIGS. 6A-6E are provided merely as an example. Other examples are possible and may differ from what was described with regard to FIGS. 6A-6E.

Implementations described herein may store IPG data on an IPG server. The IPG server may generate and stream an IPG to a media client in real time based on a user's interaction with the IPG presented by the media client. Furthermore, implementations described herein may provide an IPG for a media client that integrates control over both a media content service and a home automation service provided by a service provider.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be an open-ended terms. Further, the phrase "based on" is intended to mean "based, at least in part, on" unless explicitly stated otherwise.

What is claimed is:

1. A device, comprising:
   a memory to store instructions; and
   one or more processors, to execute the instructions in the memory, to:
   store interactive program guide (IPG) data for generating an IPG,
      the IPG data including a program guide related to a media content service for providing media content and including information related to a home automation service for managing a home device;
   receive first input information from a media client device that causes display of the IPG,
      the first input information indicating an input, received by the media client device, related to the home device, and
      the media client device including a thin client application that causes display of an initial user interface of the program guide prior to receiving the first input information;
   generate a first part of the IPG related to the home automation service based on the first input information and a first part of the IPG data;
   obtain home device information from a management server, which manages the home device, based on the first input information,
      the home device information including information related to the home device,
      the management server being separate from the device, and
      the management server controlling the home automation service;
   provide the home device information and the first part of the IPG, as streaming data in real time, to the media client device for display,
      the thin client application causing the media client device to display the home device information and the first part of the IPG as streaming data in real time;
   receive second input information from the media client related to the program guide;
   generate a second part of the IPG related to the program guide based on the second input information and a second part of the IPG data; and
   provide the second part of the IPG, as streaming data in real time, to the media client device for display,
      the thin client application causing the media client device to display the second part of the IPG as streaming data in real time.

2. The device of claim 1, where the one or more processors are further to:
   generate a request for providing the home device information,
      the request being generated based on the first input information;
   provide the request to the management server; and
   receive the home device information based on providing the request to the management server.

3. The device of claim 1, where the home device information indicates commands executable by the home device, and
   where the one or more processors are further to:
      add the home device information to the first part of the IPG.

4. The device of claim 1, where the first input information is related to a command to be executed by the home device, and
   where the one or more processors are further to:
      generate a request for the home device to execute the command; and
      send the request to the management server to cause the command to be executed by the home device.

5. The device of claim 4, where the one or more processors are further to:
   obtain execution information, from the management server, indicating a result of the home device executing the command.

6. The device of claim 1, where the one or more processors are further to:
   generate a request for status information,
      the status information including information generated by the home device;
   send the request to the management server; and
   obtain the status information from the management server based on sending the request to the management server,
      the home device information including the status information.

7. The device of claim 1, where the one or more processors are further to:
   receive the IPG data at particular times.

8. The device of claim 1, where the device is a server device that communicates with the media client device via a network, and
   where the one or more processors, when providing the home device information and the first part of the IPG data, are to:
      provide the home device information and the first part of the IPG to the media client device via the network.

9. The device of claim 1, where the one or more processors, are further to:
receive third input information from the media client related to the program guide;
generate a third part of the IPG related to the program guide based on the third input information and a third part of the IPG data; and
provide the third part of the IPG, as streaming data in real time, to the media client device for display,
the thin client application causing the media client device to display the third part of the IPG as streaming data in real time.

10. A non-transitory computer-readable medium storing instructions, the instructions comprising:
one or more instructions that, when executed by a processor of a device, cause the processor to:
store interactive program guide (IPG) data for an IPG,
the IPG data including a program guide for media content related to a media content service and including information related to a home automation service for managing a home device;
receive first input information from a media client device that causes display of the IPG,
the first input information indicating a first input, received by the media client device, related to the program guide, and
the media client device including a thin client application that causes display of an initial user interface of the program guide prior to receiving the first input information;
generate a first part of the IPG related to the program guide based on the first input information and a first part of the IPG data;
provide the first part of the IPG, as streaming data in real time, to the media client device for display,
the thin client application causing the media client device to display the first part of the IPG as streaming data in real time;
receive second input information from the media client device,
the second input information indicating a second input, received by the media client device, related to the home device;
generate a second part of the IPG related to the home automation service based on the second input information and a second part of the IPG data;
obtain home device information from a management server, which manages the home device, based on the second input information,
the home device information including information related to the home device,
the management server being separate from the device, and
the management server controlling the home automation service; and
provide the home device information and the second part of the IPG, as streaming data in real time, to the media client device for display,
the thin client application causing the media client device to display the home device information and the second part of the IPG as streaming data in real time.

11. The non-transitory computer-readable medium of claim 10, where the first part of the IPG data includes interface information for generating an interface for the first part of the IPG, schedule information indicating a schedule of programs for the program guide, and program metadata indicating a description of at least one program, and
where the one or more instructions further cause the processor to:
generate the first part of the IPG based on at least one of the interface information, the schedule information, or the program metadata.

12. The non-transitory computer-readable medium of claim 10, where the one or more instructions further cause the processor to:
receive third input information from the media client device,
the third input information indicating a third input, received by the media client device, related to the program guide;
generate a third part of the IPG related to the program guide based on the third input information and a third part of the IPG data,
the third part of the IPG being a different section of the program guide than the first part of the IPG; and
provide the third part of the IPG, as streaming data in real time, to the media client device for display,
the thin client application causing the media client device to display the third part of the IPG as streaming data in real time.

13. The non-transitory computer-readable medium of claim 10, where the home device information causes the media client device to control the home device.

14. The non-transitory computer-readable medium of claim 10, where the one or more instructions further cause the processor to:
encode the first part of the IPG based on the media client device to which the first part of the IPG is to be provided; and
provide the encoded first part of the IPG to the media client device.

15. A method comprising:
storing, by a device, interactive program guide (IPG) data for generating an IPG,
the IPG data including a program guide related to a media content service for providing media content and including information related to a home automation service for managing a home device;
receiving, by the device, first input information from a media client device that causes display of the IPG,
the first input information indicating a first input, received by the media client device, related to the home device, and
the media client device including a thin client application that causes display of an initial user interface of the program guide prior to receiving the first input information;
generating, by the device, a first part of the IPG based on the first input information and a first part of the IPG data;
receiving, by the device, home device information from a management server that manages the home device based on the first input information,
the home device information including information associated with the home device,
the management server being separate from the device, and
the management server controlling the home automation service;
sending, by the device, the home device information and the first part of the IPG, as streaming data in real time, to the media client device for display, the thin client application causing the media client device to display the home device information and the first part of the IPG as streaming data in real time;

receiving, by the device, second input information from the media client device, the second input information indicating a second input, received by the media client device, related to the program guide;

generating, by the device, a second part of the IPG related to the program guide based on the second input information and a second part of the IPG data; and sending, by the device, the second part of the IPG, as streaming data in real time, to the media client device for display, the thin client application causing the media client device to display the second part of the IPG as streaming data in real time.

16. The method of claim 15, further comprising:

encoding the home device information based on the media client device to which the home device information is to be provided; and providing the encoded home device information to the media client device as streaming data.

17. The method of claim 15, where sending the home device information and the first part of the IPG includes:

sending the home device information and the first part of the IPG according to a streaming protocol to be played by at least one of a Hypertext Markup Language (HTML) player, a HTML5 player, a JavaScript video player, or a hypertext transfer protocol (HTTP) live streaming (HLS) player.

18. The method of claim 15, further comprising:

determining that processing the first input information requires accessing the management server;

sending a request to the media client device for authentication information;

receiving the authentication information from the media client device; and authenticating access to the management server based on the authentication information.

19. The method of claim 15, further comprising:

receiving account information for a user of a service provider that provides the media content service and the home automation service, the account information indicating media content available to the user via the media client device; and generating the first part of the IPG based on the media content available to the user.

20. The method of claim 15, where sending the home device information and the first part of the IPG to the media client device includes sending the home device information and the first part of the IPG to the media client device as a media stream.

* * * * *